United States Patent
Tsai et al.

(10) Patent No.: US 9,330,044 B2
(45) Date of Patent: May 3, 2016

(54) HIGH-SPEED DATA TRANSMISSION INTERFACE CIRCUIT AND DESIGN METHOD OF THE SAME

(71) Applicant: ACCTON TECHNOLOGY CORPORATION, Hsinchu (TW)

(72) Inventors: Chih-Wei Tsai, New Taipei (TW); Shu-Jung Wu, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 512 days.

(21) Appl. No.: 13/900,545

(22) Filed: May 23, 2013

(65) Prior Publication Data

US 2014/0095756 A1    Apr. 3, 2014

(30) Foreign Application Priority Data

Sep. 28, 2012  (TW) .............................. 101135996 A

(51) Int. Cl.
G06F 13/14       (2006.01)
G06F 13/40       (2006.01)
G06F 13/38       (2006.01)

(52) U.S. Cl.
CPC .......... *G06F 13/4068* (2013.01); *G06F 13/385* (2013.01)

(58) Field of Classification Search
CPC ............................... G06F 13/36; G06F 13/364
USPC .......................................... 710/301–306, 100
See application file for complete search history.

(56) References Cited

U.S. PATENT DOCUMENTS

| | | | | |
|---|---|---|---|---|
| 6,323,672 | B1 * | 11/2001 | Starr | G06F 13/4086 326/30 |
| 2009/0284324 | A1 * | 11/2009 | Van Quach | H05K 1/0237 333/34 |
| 2012/0036284 | A1 * | 2/2012 | Tao | H04N 21/43635 710/16 |
| 2012/0286588 | A1 * | 11/2012 | Steeneken | H01H 59/0009 307/115 |

* cited by examiner

*Primary Examiner* — Tim T Vo
*Assistant Examiner* — Kim T. Huynh
(74) *Attorney, Agent, or Firm* — CKC & Partners Co., Ltd.

(57) ABSTRACT

A high-speed data transmission interface circuit used in a network switch device is provided. The high-speed data transmission interface circuit comprises a main circuit hoard, a connector and a daughter circuit board. The main circuit board comprises a transmission port interface module and a first wire. The transmission port interface module comprises a reduced pin extended attachment unit interface (RXAUI). The first wire connects the connector and the main circuit board. The daughter circuit board comprises a high definition multimedia interface (HDMI) module and a second wire. The HDMI module is connected to an external network device through a HDMI signal wire. The second wire connects the connector and the HDMI module. The transmission port interface module communicates with the external network device through the connector and the daughter board.

10 Claims, 4 Drawing Sheets

| Frequency | | Minimum | Maximum | Maximum | Minimum |
|---|---|---|---|---|---|
| | | Insertion loss variation | | Corresponding loss | Insertion loss |
| 625 | IL1 | -0.83 | 0.83 | 5.05 | 5.88 |
| 1250 | IL2 | -1 | 1 | 7.75 | 8.75 |
| 1875 | IL3 | -1.16 | 1.16 | 10.2 | 11.36 |
| 2500 | IL4 | -1.33 | 1.33 | 12.6 | 13.93 |
| 3125 | IL5 | -1.5 | 1.5 | 15.1 | 16.60 |
| 3750 | IL6 | -1.66 | 1.66 | 17.6 | 19.26 |
| 4600 | IL7 | -1.9 | 1.9 | 21 | 22.90 |
| 5000 | IL8 | -2 | 2 | 22.7 | 24.70 |
| Interconnect return loss | IRL | 12 | - | - | - |

| Frequency | | Minimum | Maximum | Maximum | Minimum |
| --- | --- | --- | --- | --- | --- |
| | | Insertion loss variation | | Corresponding loss | Insertion loss |
| 625 | IL1 | -0.83 | 0.83 | 20.05 | 20.88 |
| 1250 | IL2 | -1 | 1 | 22.75 | 23.75 |
| 1875 | IL3 | -1.16 | 1.16 | 25.20 | 26.36 |
| 2500 | IL4 | -1.33 | 1.33 | 27.60 | 28.93 |
| 3125 | IL5 | -1.5 | 1.5 | 30.10 | 31.60 |
| 3750 | IL6 | -1.66 | 1.66 | 32.60 | 34.26 |
| 4600 | IL7 | -1.9 | 1.9 | 36.00 | 37.90 |
| 5000 | IL8 | -2 | 2 | 37.70 | 39.70 |
| Interconnect return loss | IRL | 12 | - | - | - |

HIGH-SPEED DATA TRANSMISSION INTERFACE CIRCUIT AND DESIGN METHOD OF THE SAME

RELATED APPLICATIONS

This application claims priority to Taiwan Application Serial Number 101135996, filed Sep. 28, 2012, which is herein incorporated by reference.

BACKGROUND

1. Field of Invention

The disclosure relates to a data transmission technology. More particularly, the disclosure relates to a high-speed data transmission interface circuit and a design method thereof.

2. Description of Related Art

With the development of time, Internet has become one of the main media for people's communication. With the evolution of technology, the transmission rate in an internet has been increased greatly and a lot of data can be exchanged and spread around the world through Internet quickly. Between two hosts, the function of data input and output can be reached by configuring the hardware, such as a network card, a switch device and a network wire and setting various parameters according to various data transmission standard. Different hardware devices and software specifications will decide a speed of data transmission in a network.

When the demand for speed is increased, the cost of the hardware device is increased accordingly. In a transmission interface, a host is usually connected to a cable for transmission by an interface complied with a standard like as an attachment unit interface (AUI), or an extended attachment unit interface (XAUI). In recent years, a higher-speed reduced pin extended attachment unit interface (RXAUI) has been considered significantly. However, a transmission medium, direct attach cable (DAC) used between the reduced pin extended attachment unit interfaces increases a hardware cost of a network system greatly due to a price factor. Therefore, it is difficult for a high-speed data transmission to coexist with a low cost.

Therefore, it is an urgent problem for the industry to solve that how one new high-speed data transmission interface circuit and a design method thereof are designed so that a data transmission interface circuit has advantages of a high-speed data transmission and a low cost.

SUMMARY

Therefore, an aspect of the disclosure provides a high-speed data transmission interface circuit used in a network switch device. The high-speed data transmission interface circuit includes a main circuit board, a connector and a daughter circuit board. The main circuit board includes a transmission port interface module and a first wire. The transmission port interface module includes a reduced pin extended attachment unit interface (RXAUI). A first impedance of the first wire is ±10% of 100 ohms. The connector is connected to the main circuit board through the first wire. An insertion loss range of the connector at a working frequency of at least 3.125 GHz is smaller than or equal to 0.2 dB and greater than 0 dB. The daughter circuit board includes a high definition multimedia interface (HDMI) module and a second wire. The HDMI module is connected to an external network device through a HDMI signal wire. The second wire connects the connector and the HDMI module. A second impedance of the second wire is ±10% of 100 ohms. By the first wire, the transmission port interface module outputs an output data to the external network device and receives an input data from the external network device through the connector, the second wire of the daughter circuit board and the HDMI module.

According to an embodiment of the disclosure, a first length range of the first wire is smaller than or equal to 2 inches and greater than or equal to 0.01 inches. A first wire width range of the first wire is smaller than or equal to 100 mils and greater than or equal to 4 mils. The first impedance of the first wire is ±10% of 100 ohms.

According to another embodiment of the disclosure, a second length range of the second wire is smaller than or equal to 6 inches and greater than or equal to 0.01 inches. A second wire width range of the second wire is smaller than or equal to 100 mils and greater than or equal to 10 mils. The second impedance of the second wire is ±10% of 100 ohms.

According to a further embodiment of the disclosure, the insertion loss range of the connector at the working frequency of at least 3.125 GHz is smaller than or equal to 0.2 dB and greater than 0 dB.

According to yet a further embodiment of the disclosure, a main circuit board material loss tangent range of the main circuit board is smaller than or equal to 0.015 and greater than or equal to 0.001. A daughter circuit board material loss tangent range of the daughter circuit board is smaller than or equal to 0.01 and greater than or equal to 0.001.

According to still yet a further embodiment of the disclosure, the insertion loss range of the HDMI signal wire at the working frequency of at least 3.125 GHz is smaller than or equal to 5.5 dB and greater than 0 dB.

Another aspect of the disclosure provides a high-speed data transmission interface circuit design method used in a network switch device. The high-speed data transmission interface circuit design method includes: providing a main circuit board; forming a transmission port interface module on the main circuit board, wherein the transmission port interface module further includes a RXAUI; forming a first wire on the main circuit board to be connected to the transmission port interface module, wherein a first impedance of the first wire is ±10% of 100 ohms; providing a daughter circuit board; forming a HDMI module on the daughter circuit board so that the HDMI module is connected to an external network device by a HDMI signal wire; forming a second wire on the daughter circuit board to be connected to the HDMI module, wherein a second impedance of the second wire is ±10% of 100 ohms; and forming a connector to connect the first wire and the second wire, wherein an insertion loss range of the connector at a working frequency of at least 3.125 GHz is smaller than or equal to 0.2 dB and greater than 0 dB.

According to an embodiment of the disclosure, a first length range of the first wire is smaller than or equal to 2 inches and greater than or equal to 0.01 inches. A first wire width range of the first wire is smaller than or equal to 100 mils and greater than or equal to 4 mils.

According to another embodiment of the disclosure, a second length range of the second wire is smaller than or equal to 6 inches and greater than or equal to 0.01 inches. A second wire width range of the second wire is smaller than or equal to 100 mils and greater than or equal to 10 mils.

According to a further embodiment of the disclosure, a main circuit board material loss tangent range of the main circuit board is smaller than or equal to 0.015 and greater than or equal to 0.001. A daughter circuit board material loss tangent range of the daughter circuit board is smaller than or equal to 0.01 and greater than or equal to 0.001.

According to yet a further embodiment of the disclosure, the insertion loss range of the HDMI signal wire at the working frequency of at least 3.125 GHz is smaller than or equal to 5.5 dB and greater than 0 dB.

The advantage of applying the disclosure is by designing the high-speed data transmission interface circuit, the HDMI module and the HDMI signal wire are applied to the transmission port interface module including RXAUI so that the above-mentioned purpose can be realized easily.

BRIEF DESCRIPTION OF THE DRAWINGS

In order to make the foregoing as well as other purposes, features, advantages and embodiments of the disclosure more apparent, the accompanying drawings are described as follows.

DETAILED DESCRIPTION

Figure 1:
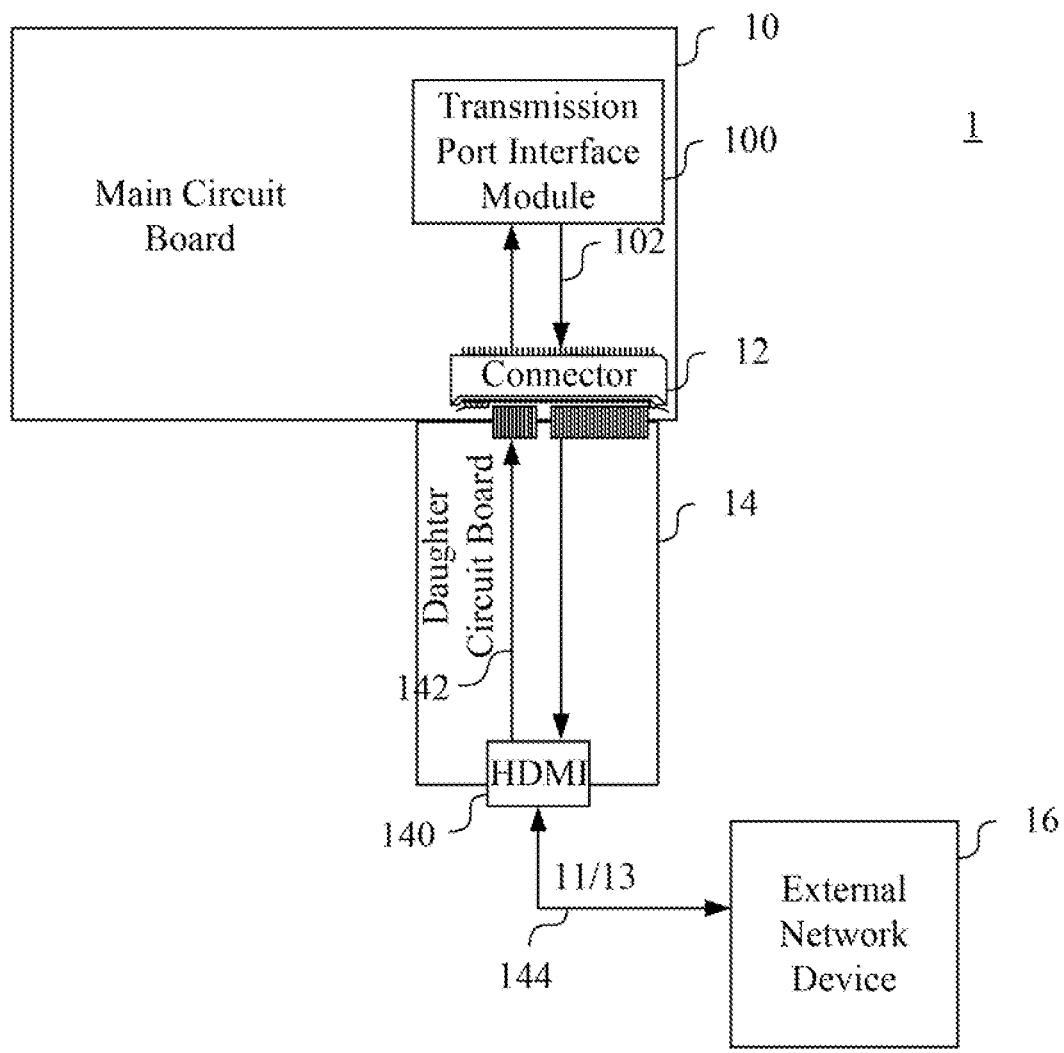
FIG. 1 is a block diagram of a high-speed data transmission interface circuit in an embodiment of the disclosure.

Referring to FIG. 1, FIG. 1 is a block diagram of a high-speed data transmission interface circuit 1 in an embodiment of the disclosure. The high-speed data transmission interface circuit 1 can be used in a network switch device (not illustrated). The network switch device is a relay device between hosts to transmit packages, so as to transmit a package generated from a host to other hosts.

The high-speed data transmission interface circuit 1 includes a main circuit board 10, a connector 12 and a daughter circuit board 14.

The main circuit board 10 includes a transmission port interface module 100 and a first wire 102. In an embodiment, a material loss tangent range of each element on the main circuit board 10 is smaller than or equal to 0.015 and greater than or equal to 0.001.

In the embodiment, the transmission port interface module 100 on the main circuit board 10 is one media access control (MAC) module and includes a reduced pin extended attachment unit interface (RXAUI).

The connector 12 is used to provide an interface which connects the main circuit board 10 and the daughter circuit board 14. In an embodiment, the connector 12 can be realized by a connection module including a golden finger and a corresponding slot (not illustrated) which are configured on the main circuit board 10 and the daughter circuit board 14 respectively. In an embodiment, an insertion loss range of the connector 12 at a working frequency of at least 3.125 GHz is smaller than or equal to 0.2 dB and greater than 0 dB.

The first wire 102 connects the connector 12 and the main circuit board 10. In an embodiment, a first length range of the first wire 102 is smaller than or equal to 2 inches and greater than or equal to 0.01 inches. A first wire width range of the first wire 102 is smaller than or equal to 100 mils and greater than or equal to 4 mils. A first impedance of the first wire 102 is ±10% of 100 ohms.

The daughter circuit board 14 includes a high definition multimedia interface (HDMI) module 140 (identified with HEMI in FIG. 1) and a second wire 142. In an embodiment, a material loss tangent range of each element on the daughter circuit board 14 is smaller than or equal to 0.01 and greater than or equal to 0.001. In an embodiment, the material loss tangent of each element on the daughter circuit board 14 can be smaller than that of each element on the main circuit board 10. Since the module on the daughter circuit board 14 is mainly used to communicate with an external network device directly, the module can be realized by the material having preferred anti-loss and anti-interference features with a higher cost generally, so that the data input and output will not be interfered. The main circuit board 10 can be realized by material having weaker anti-loss and anti-interference features with a lower cost, so that the cost of the whole high-speed data transmission interface circuit 1 is reduced.

In the embodiment, the HDMI module 140 on the daughter circuit board 14 is connected to an external network device 16 through a HDMI signal wire 144. In the embodiment, an insertion loss range of the HDMI signal wire 144 at the working frequency of at least 3.125 GHz is smaller than or equal to 5.5 dB and greater than 0 dB.

The second wire 142 is used to connect the connector 12 and the HDMI module 140. In an embodiment, a second length range of the second wire 142 is smaller than or equal to 6 inches and greater than or equal to 0.01 inches. A second wire width range of the second wire 142 is smaller than or equal to 100 mils and greater than or equal to 10 mils. A second impedance of the second wire 142 is ±10% of 100 ohms.

By the first wire 102, the transmission port interface module 100 of the main circuit board 10 outputs an output data to the external network device 16 and receives an input data from the external network device 16 through the connector 12, the second wire 142 of the daughter circuit board 14 and the HDMI module 140. In an embodiment, the external network device 16 can be another high-speed data transmission interface circuit and it can include various elements as FIG. 1.

Figures 2A, 2B:
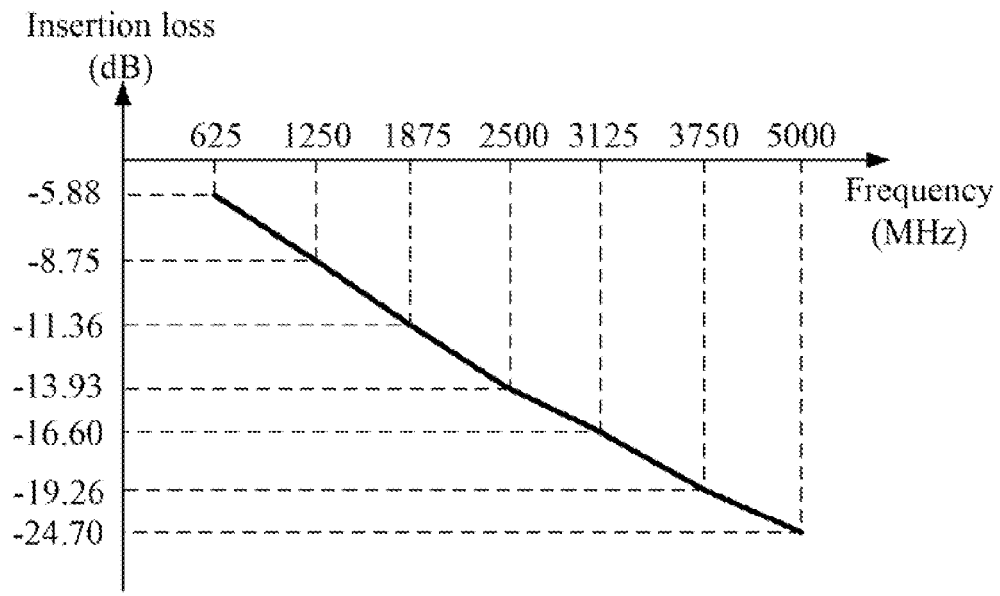
FIGS. 2A and 2B are a schematic view and a table of a relationship between a minimum tolerable insertion loss and a frequency of a transmission port interface module respectively in an embodiment of the disclosure.

In an embodiment, the transmission port interface module 100 on the main circuit board 10 realized by the MAC module can have a specific range of insertion loss tolerance. Referring to FIGS. 2A and 2B, FIGS. 2A and 2B are a schematic view and a table of the relationship between the minimum tolerable insertion loss (in dB) and the frequency (in MHz) of the transmission port interface module 100 respectively in an embodiment of the disclosure. An approximate linear relationship between each frequency and a corresponding insertion loss tolerance exists. For example, if a chip used by the transmission port interface module 100 realized by the MAC module is Marvell 98DX4101, the relationship between its insertion loss tolerance and frequency is shown as follows:

Insertion loss=−4.592×frequency−3.01;0.625≤frequency (GHz)≤1.250;

Insertion loss=−4.176×frequency−3.53;1.250≤frequency (GHz)≤1.875;

Insertion loss=−4.112×frequency−3.65;1.875≤frequency (GHz)≤2.500;

Insertion loss=−4.272×frequency−3.25;2.500≤frequency (GHz)≤3.125;

Insertion loss=−4.256×frequency−3.36;3.125≤frequency (GHz)≤3.750;

Insertion loss=−4.352×frequency−2.94;3.750≤frequency (GHz)≤5.000.

Figures 3A, 3B:
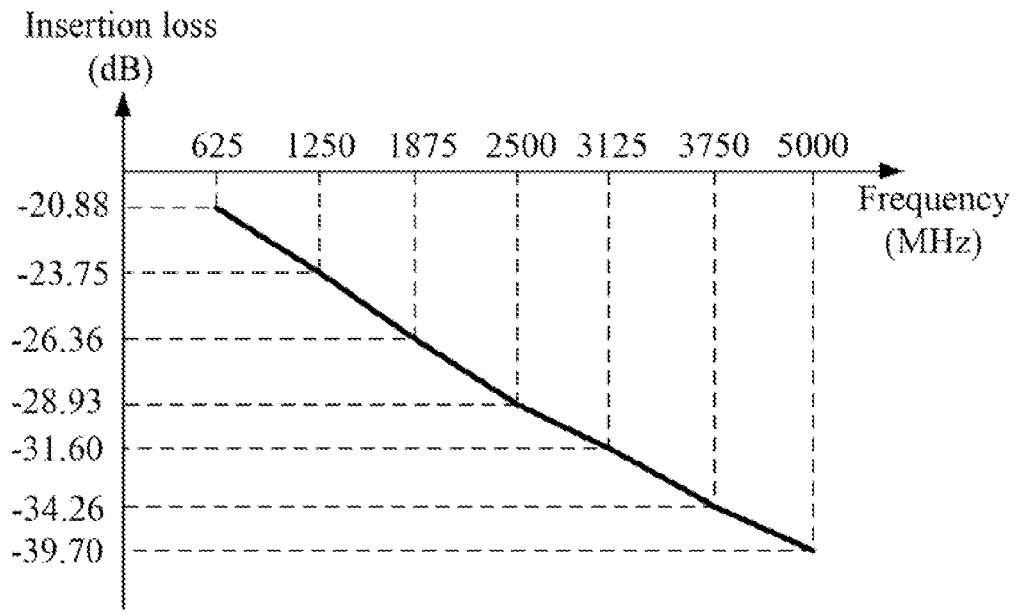
FIGS. 3A and 3B are a schematic view and a table of a relationship between a maximum tolerable insertion loss and a frequency of a transmission port interface module respectively in an embodiment of the disclosure.

FIGS. 3A and 3B are a schematic view and a table of the relationship between the maximum tolerable insertion loss (in dB) and the frequency (in MHz) of the transmission port interface module 100 respectively in an embodiment of the disclosure. Similarly, an approximate linear relationship between each frequency and a corresponding insertion loss tolerance exists. For example, if a chip used by the transmission port interface module 100 realized by the MAC module is Marvell 98DX4101, the relationship between its insertion loss tolerance and frequency is shown as follows:

Insertion loss=−4.592×frequency−18.01;0.625≤frequency (GHz)≤1.250;

Insertion loss=−4.176×frequency−18.53;1.250≤frequency (GHz≤1.875;

Insertion loss=−4.112×frequency−18.65;1.875≤frequency (GHz)≤2.500;

Insertion loss=−4.272×frequency−18.25;2.500≤frequency (GHz)≤3.125;

Insertion loss=−4.256×frequency−18.30;3.125≤frequency (GHz)≤3.750;

Insertion loss=−4.352×frequency−17.94;3.750≤frequency (GHz)≤5.000.

Through the above-mentioned design method, the high-speed data transmission interface circuit 1 will use the HDMI module and the HDMI signal wire having a low cost to transmit the data and overcome its disadvantage of easy loss at the frequency of 3.125 GHz so as to realize the transmission purpose of high speed and low cost.

Figure 4:
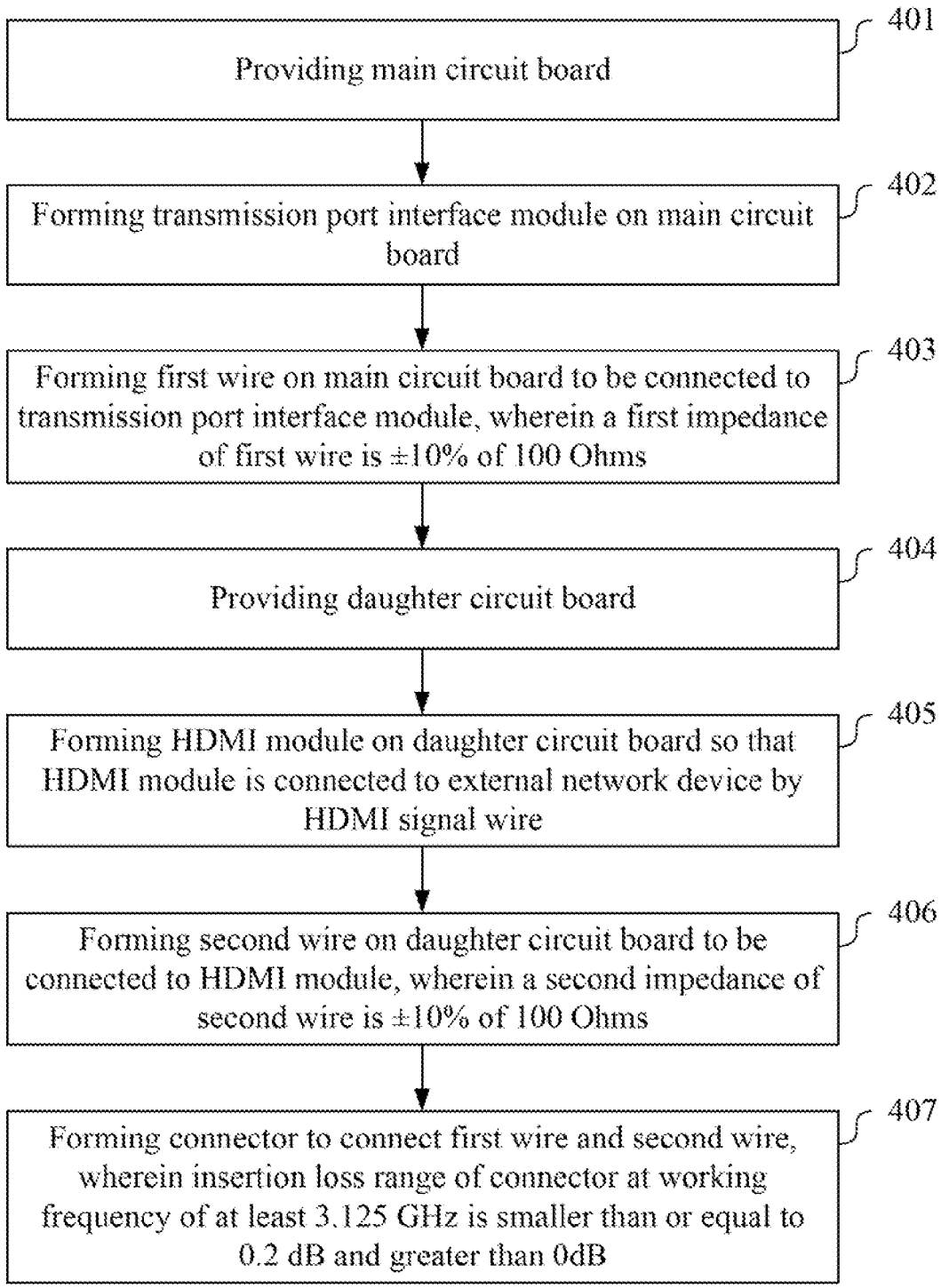
FIG. 4 is a flow chart of a high-speed data transmission interface circuit design method in an embodiment of the disclosure.

Referring to FIG. 4, FIG. 4 is a flow chart of a high-speed data transmission interface circuit design method 400 in an embodiment of the disclosure. The high-speed data transmission interface circuit design method 400 can be used in the high-speed data transmission interface circuit 1 as shown in FIG. 1. The high-speed data transmission interface circuit design method 400 includes the following steps:

At step 401, the main circuit board 10 is provided.

At step 402, the transmission port interface module 100 is formed on the main circuit board 10, wherein the transmission port interface module 100 further includes a RXAUI. In an embodiment, the main circuit board material loss tangent range of the main circuit board 10 is smaller than or equal to 0.015 and greater than or equal to 0.001.

At step 403, the first wire 102 is formed on the main circuit board 10 to be connected to the transmission port interface module 100, wherein the first impedance of the first wire 102 is ±10% of 100 ohms. In an embodiment, the first length range of the first wire 102 is smaller than or equal to 2 inches and greater than or equal to 0.01 inches. The first wire width range of the first wire 102 is smaller than or equal to 100 mils and greater than or equal to 4 mils.

At step 404, the daughter circuit board 14 is provided.

At step 405, the HDMI module 140 is formed on the daughter circuit board 14 so that the HDMI module 140 is connected to the external network device 16 by the HDMI signal wire 144. In an embodiment, the daughter circuit board material loss tangent range of the daughter circuit board 14 is smaller than or equal to 0.01 and greater than or equal to 0.001. The insertion loss range of the HDMI signal wire 144 at the working frequency of at least 3.125 GHz is smaller than or equal to 5.5 dB and greater than 0 dB.

At step 406, the second wire 142 is formed on the daughter circuit board 14 to be connected to the HDMI module 140, wherein the second impedance of the second wire 142 is ±10% of 100 ohms. In an embodiment, the second length range of the second wire 142 is smaller than or equal to 6 inches and greater than or equal to 0.01 inches. The second wire width range of the second wire 142 is smaller than or equal to 100 mils and greater than or equal to 10 mils.

At step 407 the connector 12 is formed to connect the first wire 102 and the second wire 142. The insertion loss range of the connector 12 at the working frequency of at least 3.125 GHz is smaller than or equal to 0.2 dB and more than 0 dB.

Although the disclosure has been disclosed with reference to the above embodiments, these embodiments are not intended to limit the disclosure. It will be apparent to those of skills in the art that various modifications and variations can be made without departing from the spirit and scope of the disclosure. Thus, the scope of the disclosure should be defined by the appended claims.

What is claimed is:

1. A high-speed data transmission interface circuit, used in a network switch device, comprising:
    a main circuit board, comprising:
        a transmission port interface module, further comprising a reduced pin extended attachment unit interface (RXAUI); and
        a first wire, wherein a first impedance of the first wire is ±10% of 100 ohms;
    a connector, connected to the main circuit board through the first wire, wherein an insertion loss range of the connector at a working frequency of at least 3.125 GHz is smaller than or equal to 0.2 dB and more than 0 dB; and
    a daughter circuit board, comprising:
        a high definition multimedia interface (HDMI) module, connected to an external network device by a HDMI signal wire, wherein the external network device is different from the main circuit board and the daughter circuit board; and
        a second wire, used to connect the connector and the HDMI module, wherein a second impedance of the second wire is ±10% of 100 ohms, wherein a material loss tangent of each element on the daughter circuit board is smaller than a material loss tangent of each element on the main circuit board;
    wherein by the first wire, the transmission port interface module outputs an output data to the external network device and receives an input data from the external network device through the connector, the second wire of the daughter circuit board and the HDMI module.

2. The high-speed data transmission interface circuit of claim 1, wherein a first length range of the first wire is smaller than or equal to 2 inches and greater than or equal to 0.01 inches and a first wire width range of the first wire is smaller than or equal to 100 mils and greater than or equal to 4 mils.

3. The high-speed data transmission interface circuit of claim 1, wherein a second length range of the second wire is smaller than or equal to 6 inches and greater than or equal to 0.01 inches and a second wire width range of the second wire is smaller than or equal to 100 mils and greater than or equal to 10 mils.

4. The high-speed data transmission interface circuit of claim 1, a main circuit board material loss tangent range of the main circuit board is smaller than or equal to 0.015 and greater than or equal to 0.001 and a daughter circuit board material loss tangent range of the daughter circuit board is smaller than or equal to 0.01 and greater than or equal to 0.001.

5. The high-speed data transmission interface circuit of claim 1, wherein an insertion loss range of the HDMI signal wire at the working frequency of at least 3.125 GHz is smaller than or equal to 5.5 dB and greater than 0 dB.

6. A high-speed data transmission interface circuit design method, used in a network switch device, comprising:
providing a main circuit board;
forming a transmission port interface module on the main circuit board, wherein the transmission port interface module further comprises a RXAUI;
forming a first wire on the main circuit board to be connected to the transmission port interface module, wherein a first impedance of the first wire is ±10% of 100 ohms;
providing a daughter circuit board;
forming a HDMI module on the daughter circuit board so that the HDMI module is connected to an external network device by a HDMI signal wire, wherein the external network device is different from the main circuit board and the daughter circuit board;
forming a second wire on the daughter circuit board to be connected to the HDMI module, wherein a second impedance of the second wire is ±10% of 100 ohms; and
forming a connector to connect the first wire and the second wire, wherein an insertion loss range of the connector at a working frequency of at least 3.125 GHz is smaller than or equal to 0.2 dB and greater than 0 dB, wherein a material loss tangent of each element on the daughter circuit board is smaller than a material loss tangent of each element on the main circuit board.

7. The high-speed data transmission interface circuit design method of claim 6, wherein a first length range of the first wire is smaller than or equal to 2 inches and greater than or equal to 0.01 inches and a first wire width range of the first wire is smaller than or equal to 100 mils and greater than or equal to 4 mils.

8. The high-speed data transmission interface circuit design method of claim 6, wherein a second length range of the second wire is smaller than or equal to 6 inches and greater than or equal to 0.01 inches and a second wire width range of the second wire is smaller than or equal to 100 mils and greater than or equal to 10 mils.

9. The high-speed data transmission interface circuit design method of claim 6, wherein a main circuit board material loss tangent range of the main circuit board is smaller than or equal to 0.015 and greater than or equal to 0.001 and a daughter circuit board material loss tangent range of the daughter circuit board is smaller than or equal to 0.01 and greater than or equal to 0.001.

10. The high-speed data transmission interface circuit design method of claim 6, wherein an insertion loss range of the HDMI signal wire at the working frequency of at least 3.125 GHz is smaller than or equal to 5.5 dB and greater than 0 dB.

* * * * *